United States Patent [19]
Kikuchi et al.

[11] Patent Number: 5,484,045
[45] Date of Patent: Jan. 16, 1996

[54] FLUID CLUTCH

[75] Inventors: Yasuhei Kikuchi; Mitsuaki Hatori; Satoshi Tsuyuki, all of Tagata, Japan

[73] Assignee: Usui Kokusai Sangyo Kaisha Ltd., Japan

[21] Appl. No.: 210,923

[22] Filed: Mar. 21, 1994

[51] Int. Cl.$^6$ .............................. F16D 35/02; F16D 43/25
[52] U.S. Cl. .................. 192/58.4; 192/82 T; 192/103 F
[58] Field of Search ................... 192/58 B, 82 T, 192/103 F

[56] References Cited

U.S. PATENT DOCUMENTS

| | | | |
|---|---|---|---|
| 3,458,020 | 7/1969 | Lutz | 192/58 B |
| 3,688,884 | 9/1972 | Perrin et al. | 192/58 B |
| 4,007,819 | 2/1977 | Maci | 192/58 B |
| 4,355,709 | 10/1982 | Light | 192/58 B |
| 4,405,039 | 9/1983 | Hauser | 192/58 B |
| 5,199,539 | 4/1993 | Kikuchi | 192/82 T X |

FOREIGN PATENT DOCUMENTS

| | | | |
|---|---|---|---|
| 62-224734 | 10/1987 | Japan | 192/58 B |
| 63-21048 | 5/1988 | Japan . | |
| 4-258531 | 9/1992 | Japan | 192/58 B |

*Primary Examiner*—Rodney H. Bonck
*Attorney, Agent, or Firm*—Anthony J. Casella; Gerald E. Hespos

[57] ABSTRACT

A fluid clutch includes a rotatably driven shaft. A closed casing is rotatably mounted on the shaft by bearings. The casing includes an oil basin chamber and a torque transfer chamber. A driving disc is rigidly mounted to the shaft and in the torque transfer chamber. An exhaust passage extends from an outer position in the torque transfer chamber to the oil basin chamber. A dam in the torque transfer chamber urges oil into the exhaust passage and to the oil basin chamber. A pump is disposed between the oil basin chamber and the torque transfer chamber and is operative to urge oil from the oil basin chamber downstream into the torque transfer chamber. A valve is operative to selectively open or close access to the pump in accordance with sensed temperature. Thus, the dam and exhaust passage urge oil from the torque transfer chamber to prevent accompanying rotation. However, the pump urges oil into the torque transfer chamber in accordance with cooling needs.

17 Claims, 8 Drawing Sheets

FLUID CLUTCH

BACKGROUND OF THE INVENTION

1. Field of the Invention

The present invention relates to a fluid clutch to be used in transferring driving torque of a driving disc to a case through an oil medium by which the oil is supplied to a torque-transfer chamber, more specifically related to a fluid clutch meant to act as a control of the rotational movement of a cooling fan for an automobile engine which is provided to a case. For more details, this invention relates to a temperature-sensitive type fluid clutch which has an automatic control function for an operation of a cooling fan utilized for an internal combustion engine that is supplied for vehicles in accordance to ambient temperature conditions.

2. Description of the Prior Art

As a fluid clutch device utilized for the aim of controlling a rotational movement of a cooling fan in an internal combustion engine for vehicles, it is a common method to transfer a driving torque of the driving disc through an oil medium that is supplied in the torque transfer chamber. In prior art structure of the fluid clutch mechanism, for example, a coupling device (fluid clutch) is described in Tokkosho 63-21048), in which the inside of a closed housing is divided into a torque transfer chamber and an off basin chamber by means of a partition plate. A driving disc is being disposed inside the torque transfer chamber in a rotatable manner through a driving movement of the driving portion, oil in the oil basin chamber is being supplied to the torque transfer chamber through a flow control hole which has been formed on the partition plate, and the oil in the torque transfer chamber is returned back to the oil basin chamber through a dam that has been provided on the inner peripheral wall of the closed housing being opposite to the driving disc and a circulatory path which has been connected to the dam. By utilizing the aforementioned type of a fluid clutch, a driving torque created on the driving disc will be successively transferred to a case through the oil that is supplied from the oil basin chamber to the torque transfer chamber and this in turn will cause the rotation of a fan disposed on the case, so that, for example, automobile engine can be cooled. Moreover, this type of the fluid clutch will act as an aid to detect an ambient temperature through a bimetal, so that when the temperature raises, an opening angle of the flow control hole is increased and this will lead to the increase of the amount of oil inside the torque transfer chamber, resulting in increasing the revolution of the case so that the fan will rotate at a consequently higher speed and this will enhance the cooling efficiency.

However, the foregoing types of a fluid clutch possess the following drawbacks. Namely, in cases when the engine starts with a large volume of oil inside the torque transfer chamber or when the engine accelerates rapidly, a case (or cooling fan) located on a driving side will be subjected to a rapid increase of revolution for a short period of time due to the presence of the large volume of oil inside the torque transfer chamber in accordance with an acceleration of the driving disc on the driving side. This phenomenon is called as "accompanying rotation" which represents in fact a number of disadvantages which are fan noise, discomfort accompanied by the fan noise, and reduction of the fuel efficiency.

The "accompanying rotation" phenomenon that takes place in a re-starting engine having the aforementioned conventional type of the fluid clutch will become of a much more effect if the oil mount in the torque transfer chamber is of a larger quantity. As a means to overcome the problem, as for example what has been disclosed in Tokkosho 63-21048, the oil flowing out from the flow control hole on the partition plate is being driven to get introduced momentarily to an opposite side along the diametral direction and then the oil is to be supplied to the torque transfer chamber.

According to the aforementioned structure, when the engine stops while there is almost no oil inside the torque transfer chamber and a plenty of oil is present inside the oil basin chamber, the "accompanying rotation" phenomenon would not take place among a re-starting of the engine since the oil would not flow from the off basin chamber into the torque transfer chamber. However, the foregoing structure can not prevent the "accompanying rotation" phenomenon in the cases when re-starting the engine while there is a large volume of oil inside the torque transfer chamber or the case when the engine is rapidly accelerated.

Hence, it is necessary to increase the exhausting capacity by the aforementioned dam so that the previously described excess oil remaining in the torque transfer chamber would be exhausted as soon as possible at a re-starting or rapid acceleration of the engine. The exhausting capacity that is meant to be given by the dam can be increased by changing a size, shape or number of the dam. However, since, according to the conventional type of the fluid clutch, the off supply to the torque transfer chamber is achieved only by a centrifugal force acting on the circulating oil inside the oil basin chamber, and this means that a large flow rate can not be achieved so that the oil supply capacity is low. This is considered to be a disadvantage. Therefore, even if by making use of the exhausting capacity supplied by the dam, the circulating amount of off is controlled by the supplying capacity, and this means that the oil level in the torque transfer chamber is under the required level and a desired fan rotation is not achieved. Moreover, under the circumstances when the circulating amount of oil is small, the remaining time of the oil between the torque transferring surfaces will become larger, causing the oil temperature to increase and an expected oil deterioration is more likely to occur due to the fact that the oil will absorb the thermal energy generated by the slipping due to the rotational differences between the case and the disc.

SUMMARY OF THE INVENTION

This invention provides a fluid clutch by which the oil supply capacity is increased by means of a pumping mechanism to improve the circulating mount of the oil that will prevent the oil temperature to increase and the early deterioration of shafts or the like. Furthermore, by the presently invented fluid clutch, the "accompanying rotation" phenomenon under the various conditions described previously can be prevented. Moreover, the associated drawbacks can be avoided, namely, the fan noise level can be reduced and the fuel efficiency can be improved. Furthermore, a torque from the driving disc can be transferred at the optimize condition to the case according to the various driving conditions, for example, ambient temperature.

According to the first aspect of this invention, a fluid clutch that is designed to involve a driving portion, a rotating shaft which rotates by the driving portion, a driving disc which rotates by means of the rotating shaft, a closed housing which contains the driving disc and is disposed rotatably with respect to the rotating shaft, a torque transfer chamber in which the driving disc is disposed inside the case, and an off basin chamber. Hence by the above description of the fluid clutch, the oil is supplied from the oil basin chamber to the torque transfer chamber and this will lead to a transfer of the driving torque of the driving disc to the closed housing. The fluid clutch is furtherly provided by an exhausting passage to feed the supplied oil from the torque transfer chamber to the off basin chamber through the dam mechanism which is designed to be located on the inner wall of the closed case, a pumping mechanism which utilizes the differences in revolution between the rotating shaft disposed inside the case and the case, an oil supply passage maintained to supply the oil inside the off basin chamber to the torque transfer chamber through the aforementioned pumping mechanism, a valve means that is designed to open or close the oil supply passage, an operating means for the valve means which is provided outside the oil basin chamber of the closed case and a piston handle to operatably connect the valve means and the operating means for the valve means.

The second aspect of the presently invented fluid clutch is to transfer a driving torque of a driving disc to a closed case and this is achieved by supplying the off from an off basin chamber to a torque transfer chamber. The fluid clutch to serve in this way is designed to involve a driving portion, a rotating shaft to rotate the driving portion, the driving disc to rotatably operate the rotating shaft, the dosed case in which the driving disc is provided and is disposed rotatably with respect to the rotating shaft, the torque transfer chamber which contains the driving disc inside the case and the off basin chamber to store the circulating oil. In addition, the fluid clutch is furtherly composed of an exhausting passage to supply the fed oil from the torque transfer chamber to the oil basin chamber by means of the dam mechanism which is disposed on the inner surface in the closed case, a pumping mechanism utilizing the differences in revolution between the case and rotating shaft which is provided inside the case, a supply passage and exhausting hole which will act to supply the oil inside the oil basin chamber to the torque transfer chamber through the pumping mechanism, a partition plate having a flow control hole for the oil that is circulating through the oil supply passage, a plate-shaped valve portion that is provided in the off basin chamber, a temperature sensing member that is designed in such a manner to consist of the bimetal provided at the out,side of the oil basin chamber of the closed case which is connected and projected through the closed case at one end thereof and is connected to the plate-shaped valve portion at the other end thereof, ,so that the flow control hole can be opened or closed by the plate-shaped valve portion which operates in accordance with the curved deformation of the temperature sensing member in cases when the temperature changes.

When a strip-type bimetal is employed, the base portion of the plate-shaped valve portion is secured to the partition plate and a free end thereof is provided in a position dose to a periphery of the flow control hole. When a spiral-type bimetal is utilized, the plate-shaped valve portion should not be secured to the partition plate, but should be positioned in contact rotatably to the partition plate.

Moreover, according to the third aspect of this invention, the fluid clutch is constructed in a way to have a driving portion, .a rotating shaft to rotate the driving portion, a driving disc to rotatably drive the rotating shaft, a closed case in which the driving disc is disposed and is provided rotatably with respect to the rotating shaft, a torque transfer chamber which involve the driving disc inside the case and an oil basin chamber to store the circulating oil, so that the oil can be supplied from the oil basin chamber to the torque transfer chamber and in turn the driving torque generated at the driving disc can be transferred to the closed case. The fluid clutch is furtherly composed of an exhausting passage whose presence is essential to supply the fed off from the torque transfer chamber to the oil basin chamber through the dam mechanism which is provided on the inner periphery of the closed case, a pumping mechanism employing differences in revolution between the case and the rotating shaft that is provided inside the ease, an oil supply passage which is disposed inside the oil basin chamber and is used for supplying the oil from the oil basin chamber to the torque transfer chamber through the aforementioned pumping mechanism, a partition plate in which a switching valve for the supplying passage is installed, and a solenoid-type actuator which is disposed on outer wall of the oil basin chamber of the closed case, so that supplied switching valve in be operated in accordance with the forward or backward movements of a piston handle in the solenoid.

The solenoid-type actuator is fixed on the outer surface of the-closed case and an electric source is supplied to the actuator by means of a slipping mechanism. According to this aspect of the present invention, it is characterized that the solenoid-type actuator is secured in place to a vehicle body, the radiator, a fan shroud, or the engine block through a stay.

To any one of the aforementioned aspects of this invention, any of the following; vane pump, trochoid pump, or gear pump can be employed for the pumping mechanism.

According to the present invention, the oil inside the oil basin chamber is forced to supply to the torque transfer chamber under the pumping mechanism which rotates as a result of the differences in revolutions between the rotating shaft and the case, and the off in the torque transfer chamber is forced to circulate to the off basin chamber through the action of the supplied dam mechanism which is disposed on the inner face of: the case.

According to the first aspect of the present invention, when the off in the oil basin chamber is being fed to the torque transfer chamber through the pumping mechanism, the valve portion of the flow control hole for the off in the oil basin chamber will be operated by the bimetal provided in a location outside the case in accordance with the ambient temperature and in cases when the ambient temperature raises an amount of oil is supplied to the torque transfer chamber enough that it causes the increase in the revolution of the case (in other words, cooling fan). On the other hand, in cases when the ambient temperature is reduced, the amount of oil supplied from the oil basin chamber to the torque transfer chamber through the valve portion will be reduced or zeroed and this consequently will reduce the revolution of the case (or cooling fan).

Furthermore, according to another aspect of this invention, various sensors as a controlling means for the switching valve of the pumping mechanism are being utilized and this will help in the detection of the water temperature of the cooling water for the driving portion, revolution of engine, revolution of the case. The solenoid type actuator is also controlled by using a control unit including a microcomputer. The aforementioned switching valve is dosed in occasions when the control signal is not output from the sensors or control unit to shut off the supply passage connecting from the off basin chamber to the torque transfer chamber. When the control signal is input, the switching valve is designed to be opened, and this will cause the oil to be sucked from the off basin chamber through the supply passage under an action of the pumping mechanism and will be pressurized to be fed into the torque transfer chamber. The oil inside the torque transfer chamber is going to be circulated and returned back to the oil basin chamber through the exhaust passage through the dam mechanism which has a de,sired exhausting capacity.

Consequently, when the supply passage is opened by operating the switching valve by means of the solenoid type actuator, the oil will be allowed to pass from the off basin chamber through the switching valve and the supply passage under a suction action of the pumping mechanism and the pressurized by the pumping mechanism to be exhausted and fed to the torque transfer chamber, so that the revolution of the case (or cooling fan) will be increased. On the other hand, when the supply passage is closed by operating the switching valve by the solenoid type actuator, the oil fed from the oil basin chamber to the torque transfer chamber will in mm get reduced or zeroed, causing a reduction in the revolution of the case (cooling fan). In the latter aspect, by controlling the supplied mount of oil by output signals from the sensors to detect the water temperature of the cooling water for the driving portion, or the revolution of engine or the case, this will lead to the fact that the mount of oil can be controlled accurately and precisely. Hence the torque generated from the driving disc can be transferred to the case at the optimize condition in accordance with the variously fluctuating driving conditions.

As a result, according to the present invention, the torque from the driving disc can be transferred to the case at the most suitable conditions by optimizely manipulating the valve portion and open/close valve in accordance with variously changing the driving conditions which can be corresponded to the ambient temperature and to controlling signals which are the means to detect water temperature of cooling water for the driving portion, or revolution of the engine and the case.

Since the oil supply is achieved by means of an internally disposed pump mechanism, the resulting supplying capacity is large; hence accordingly a large exhausting capacity can be set for the dam. Therefore, not only in case of the re-start of the engine, but also at the rapid acceleration of the engine, the "accompanying rotation" phenomenon that usually take place can be prevented. At the same time, the discomfort resulting from the fan noise level can be minimized and the improvement of the fuel efficiency can be achieved. Furthermore, the circulating amount of oil can be larger, so that the remaining time of the oil between the torque transferring surfaces will become shorter, leading to that unnecessary raise of the oil temperature can be suppressed to prevent early deterioration of oil or shaft and to prolong to life time of the system.

DETAILS DESCRIPTION OF THE PREFERRED EMBODIMENTS

Figures 1A, 1B:
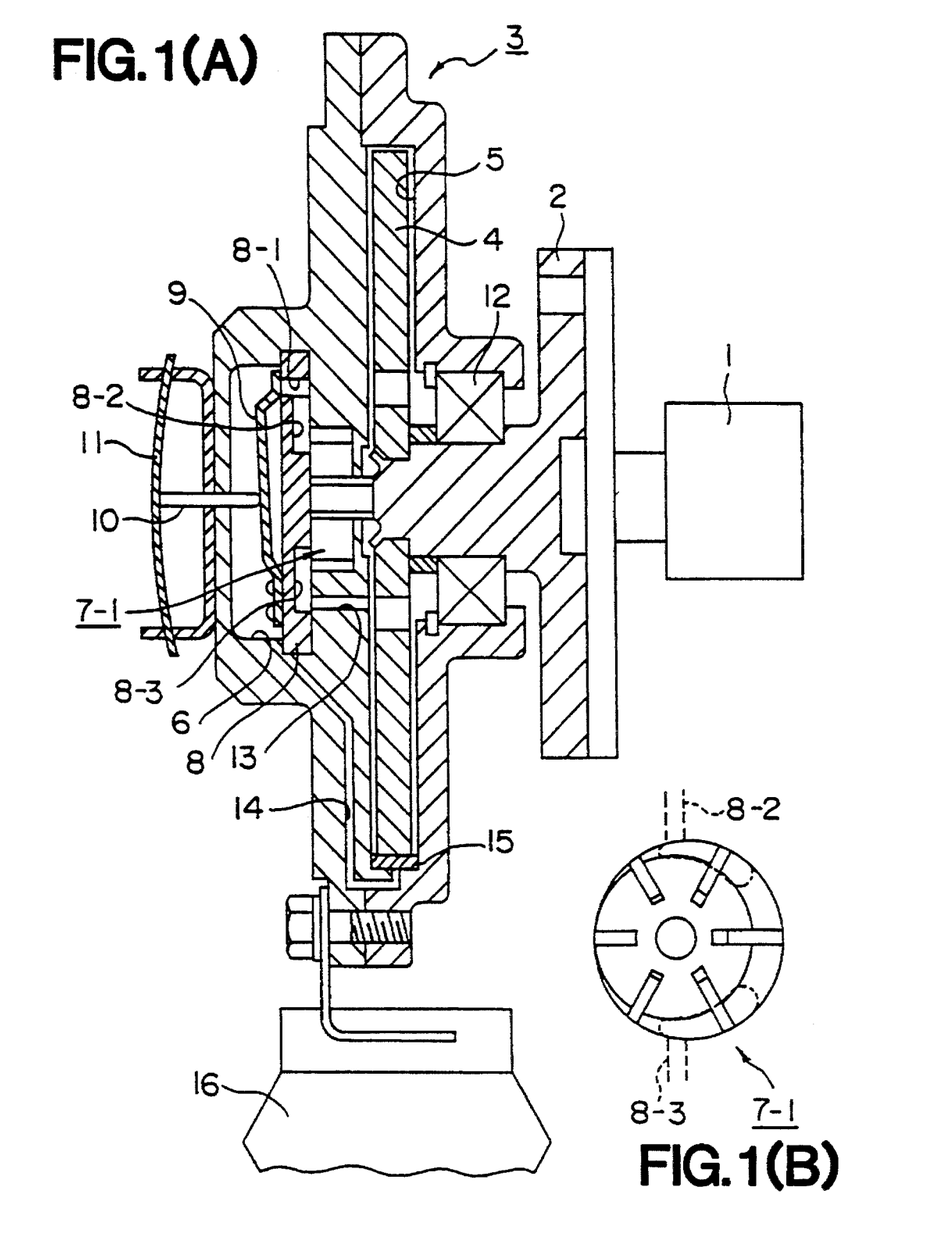
FIGS. 1(A) and 1(B) show an example of the temperature-sensitive type fluid clutch according to present invention; (A) is a vertically cross-sectional view showing the entire structure of the fluid clutch utilizing the vane pump as a pumping mechanism and (B) is a generalized front view of the vane pump.
Figures 2A, 2B:
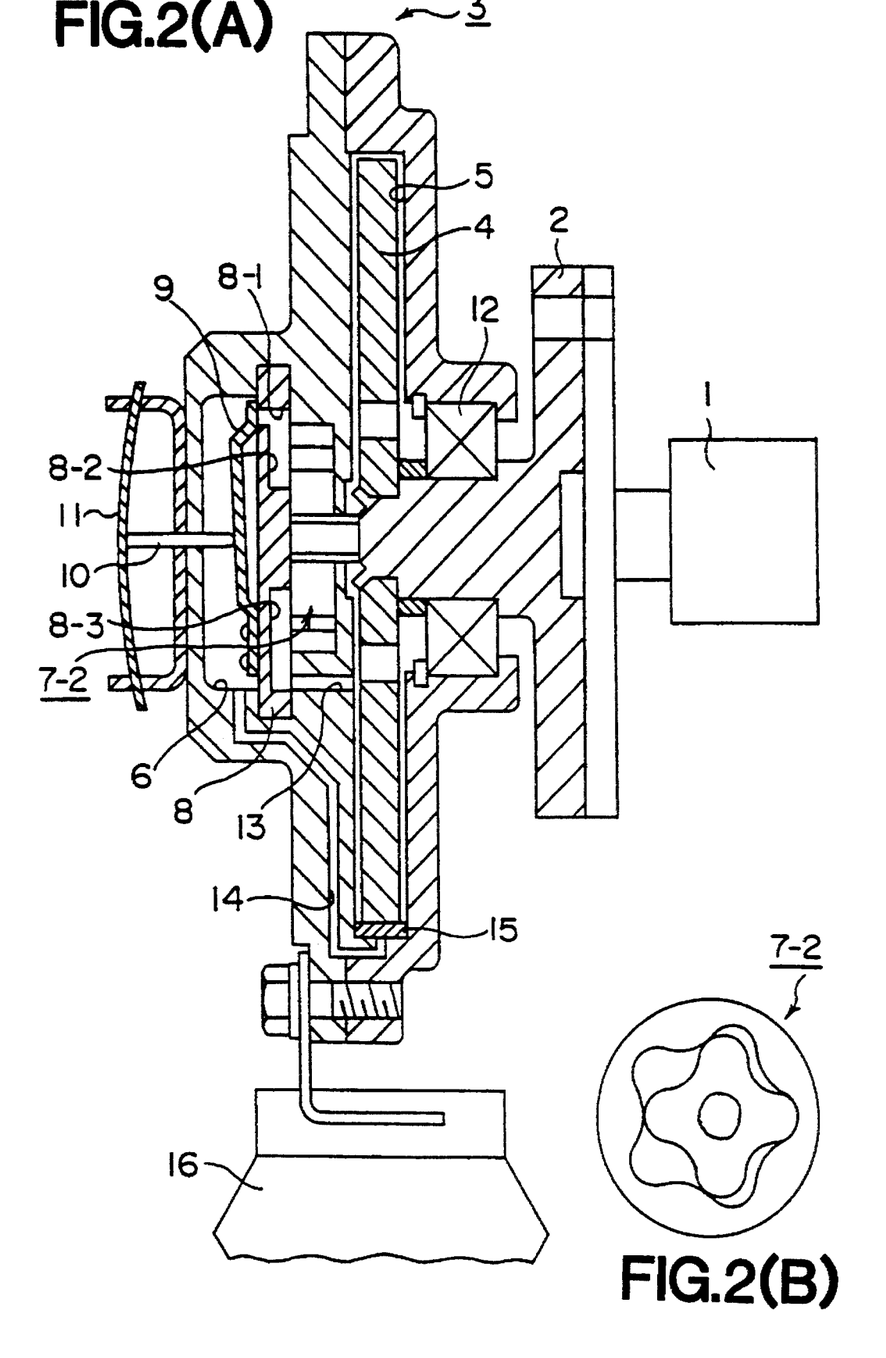
FIGS. 2(A) and 2(B) show a temperature-sensitive type fluid clutch employing a trochoid pump according to the present invention; (A) is a vertically cross-sectional view showing the entire structure of the fluid clutch that is utilizing the trochoid pump as a pumping mechanism and (B) is a generalized front view of the trochoid pump.
Figures 3A, 3B:
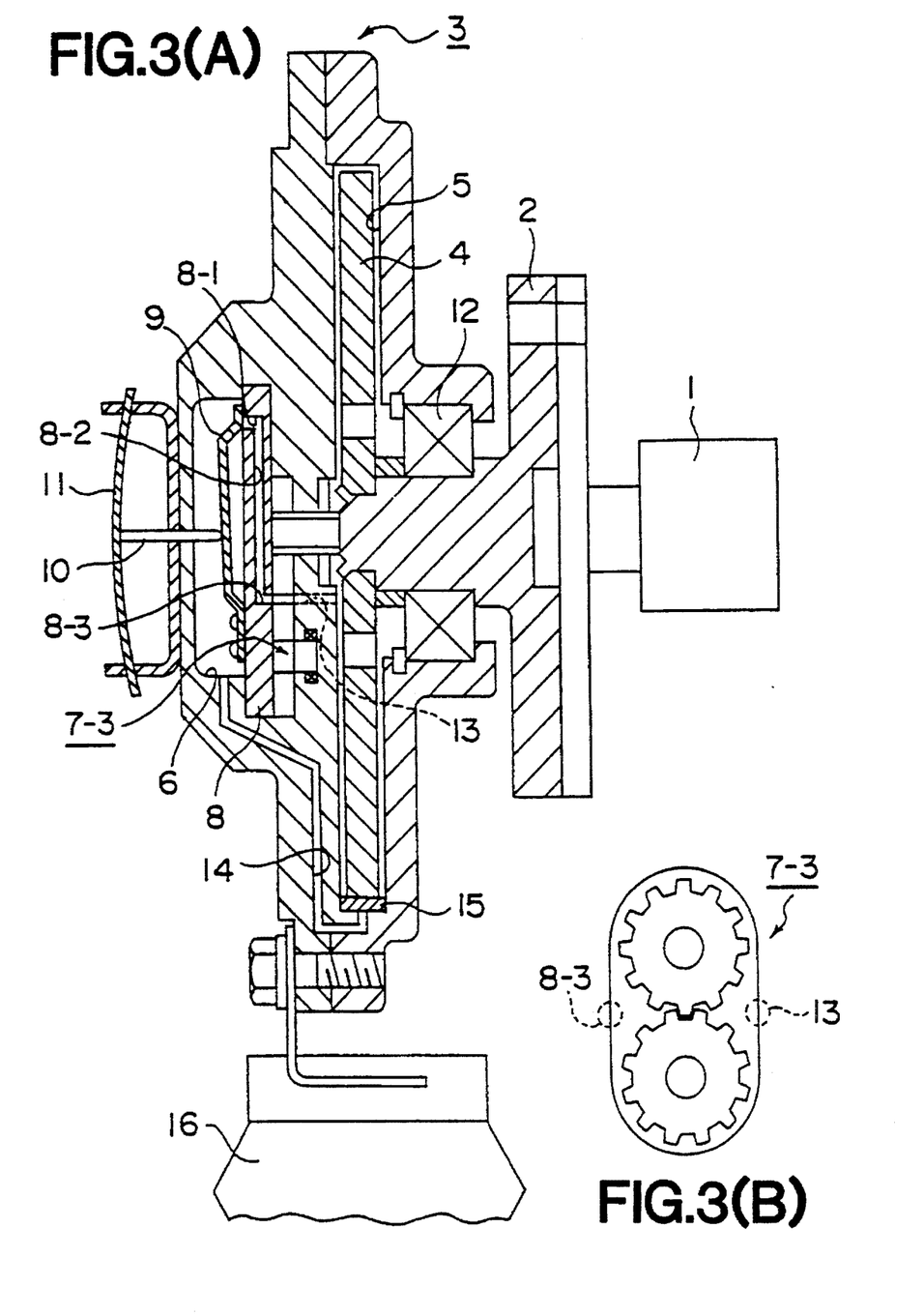
FIGS. 3(A) and 3(B) show a temperature-sensitive type fluid clutch that has been constructed to employ a gear pump according to the present invention; (A) is a vertically cross-sectional view showing an entire structure of the fluid clutch utilizing the gear pump as a pumping mechanism and (B) is a generalized front view of the gear pump.

The temperature-sensitive type fluid clutch according to this invention will be in great details described by referring to FIGS. 1 through 3.

There are the following parts given the respective designation in the embodiments: a driving portion of the engine ot the vehicle 1, a rotation shaft 2, a closed case 3, a driving disc 4, a torque transfer chamber 5, oil basin chamber 6, a vane pumping mechanism 7-1, a trochoid pumping mechanism 7-2, a gear pumping mechanism 7-3, a partition plate 8, a flow control hole 8-1, an oil supply passage 8-2, a valve portion 9, a valve actuator 10, strip type bimetal 11-1, spiral type bimetal 11-2, a bearing 12, an exhausting hole 13, an exhaust passage 14, a dam 15, and a cooling fan 16.

Namely, in the temperature*sensitive type fluid clutch of this invention, the closed case 3 designed to have a large diameter and short length is rotatably disposed to the rotating shaft 2 which rotates by means of the driving portion (engine) 1 through the bearing 12. Inner area of the case 3 is divided into the torque transfer chamber 5 and oil basin chamber 6 by the partition plate 8. Furthermore, inside the torque transfer chamber 5, the disk-shaped driving disc 4 which is fixed to an edge portion of the rotating shaft 2 is provided in such a way that a torque transferring clearance is formed between the driving disc and the inner surface of the torque transfer chamber 5.

In the fluid clutch system seen in FIG. 1, the oil in the oil basin chamber 6 is meant to be supplied from the flow control hole 8-1 of the partition plate 8 to the vane pumping mechanism 7-1 which is assembled between the case 3 and the partition plate 8 through the oil supply passage 8-2: The oil which is consequently pressurized by the aforementioned pumping mechanism 7-1 is furtherly fed to the torque transfer chamber 5 through the oil supply passage 8-3 and the exhausting hole 13. In the torque transfer chamber 5 and the oil basin chamber 6, a circulating passage is formed which in fact is obtained from the connections of the flow control hole 8-1 disposed at the partition plate 8, the oil supply passage 8-2, 8-3, the exhausting hole 13 provided at the case 3, the vane pumping mechanism 7-1 and the exhaust passage 14. Moreover, on the inner surface of the case 3, the dam 15 is provided close to an inlet port of the exhaust passage 14 in order to supply in a smooth way the oil from the torque transfer chamber 5 to the oil basin chamber 6.

The vane pumping mechanism 7-1 is constructed in such a way that a rotor and a vane are disposed at a distal end of the rotating shaft 2. The pumping mechanism can be rotatably operated by making use of the differences in revolutions caused by a slipping action between the case 3 and the driving disc 4 (rotating shaft), so that the oil in the oil basin chamber 6 will be sucked through the flow control hole 8-1 of the partition plate 8 and the oil supply passage 8-2 by the pumping mechanism and the thus consequently pressurized oil is furtherly supplied to the torque transfer chamber 5 through the oil supply passage 8-3 on the out-flow side and the exhausting hole 13.

One end of the valve portion 9 is secured to the partition plate 8 which is disposed inside the oil basin chamber 6 and the other end thereof so as to be provided in such a way that it covers the flow control hole 8-1 on a supply side of the vane pumping mechanism 7-1. The inner end of the valve portion, 9 is located to be in contact to central portion of the vane portion and the outer end thereof is disposed to be operatable by the valve actuator 10 which is in contact to the strip type bimetal 11 provided in a place on the outer side of the oil basin chamber 6. Namely, the valve portion 9 moves in accordance with the curved deformation of the strip-type bimetal that takes place due to the temperature differences and opens or doses the flow control hole 8-1 which is disposed at the partition plate 8. With the aforementioned structure, when the ambient temperature is high, the strip type bimetal 11 deforms in such a way that it will attain a convex shape to pull the valve portion 9 through the valve actuator 10, so that the flow control hole 8-1 of the partition plate 8 will be opened. Hence, the oil in the oil basin chamber 6 is then supplied to the vane pumping mechanism 7-1 and the oil pressurized by the pumping mechanism is furtherly supplied to the torque transfer chamber 5 through the oil supply passage 8-3 and the exhausting hole 13. In consequence, when the amount of oil supplied to the torque transfer chamber 5 increases, the torque transferring ratio by the oil in the oil basin chamber 5 will be 18 enhanced and the revolution of the case 3 will also increase, and this will result in accelerating the cooling fan 16.

On the other hand, if the ambient temperature is low, since the strip type bimetal 11 pushes the valve portion 9 through the valve actuator 10 to close the flow control hole 8-1 of the partition plate 8. At the same time when the oil supplied from the off basin chamber 6 to the torque transfer chamber 5 stops, the oil in the torque transfer chamber 5 will be returned to the oil basin chamber 6 through the exhaust passage 14 under the action caused by the dam 15, so that the torque transferring ratio will be reduced, the revolution of the case 3 also will be decreased, and the revolution of the cooling fan 16 is going to be also reduced.

Accordingly, a smooth and rapid supply of the oil to the off basin chamber 6 through the pumping mechanism can not only be achieved, but a dam 15 which has a corresponding capacity to the increased supplying capacity of the off can also be utilized. Hence by setting the exhausting capacity of the dam, even when a large volume of oil that will be remaining inside the torque transfer chamber 5, the off inside the torque transfer chamber 5 can be quickly exhausted in the cases of re-starting or accelerating the engine; hence the revolution of the cooling fan 16 and the noise level will be reduced and uneconomical fuel consumption can be prevented as well. Furthermore, because of increasing the amount of circulating off, the remaining time of the off between the torque transferring surfaces become shorter, and this will cause the undesired temperature raise of the oil to be definitely avoided.

By the fluid clutch in which the trochoid type pumping mechanism is being employed as seen in Pig. 2, the oil in the oil basin chamber 6 is sucked from the flow control hole 8-1 of the partition plate 8 by means of the oil supply passage 8-2 to the trochoid type pump 7-2 which is assembled in location between the case.3 and the partition plate 8, the oil pressurized by the aforementioned pumping mechanism 7-1 is going to be fed to the torque transfer chamber 5 through the off supply passage 8-3 and the exhausting hole 13.

In the trochoid type pumping mechanism 7-2, a rotor is disposed at the distal end of the rotating shaft 2 and is rotatably driven by the differences in revolutions that are caused by the slip between the case 3 and the driving disc 4 (rotating shaft). Hence, the oil in the oil basin chamber 6 will be sucked through the flow control hole 8-1 and the oil supply passage 8-2 of the partition plum 8 by the action of the pumping mechanism, and the thus pressurized oil is fed to the torque transfer chamber 5 through the oil supply passage 8-3 on the flow-out side and the exhausting hole 13.

By the fluid clutch which is designed with a gear pump mechanism as seen in FIG. 3, the gear pumping mechanism 7-3 is assembled between the case 3 and the partition plate 8. Hence the oil in the off basin chamber will be sucked from the flow control hole 8-1 through the oil supply passage 8-2 and a suction inlet 8-3 to the gear pumping mechanism 7-3. The thus pressurized oil by the aforementioned gear pumping mechanism will be consequently fed from the exhausting hole 13 to the torque transfer chamber 5.

Figure 4:
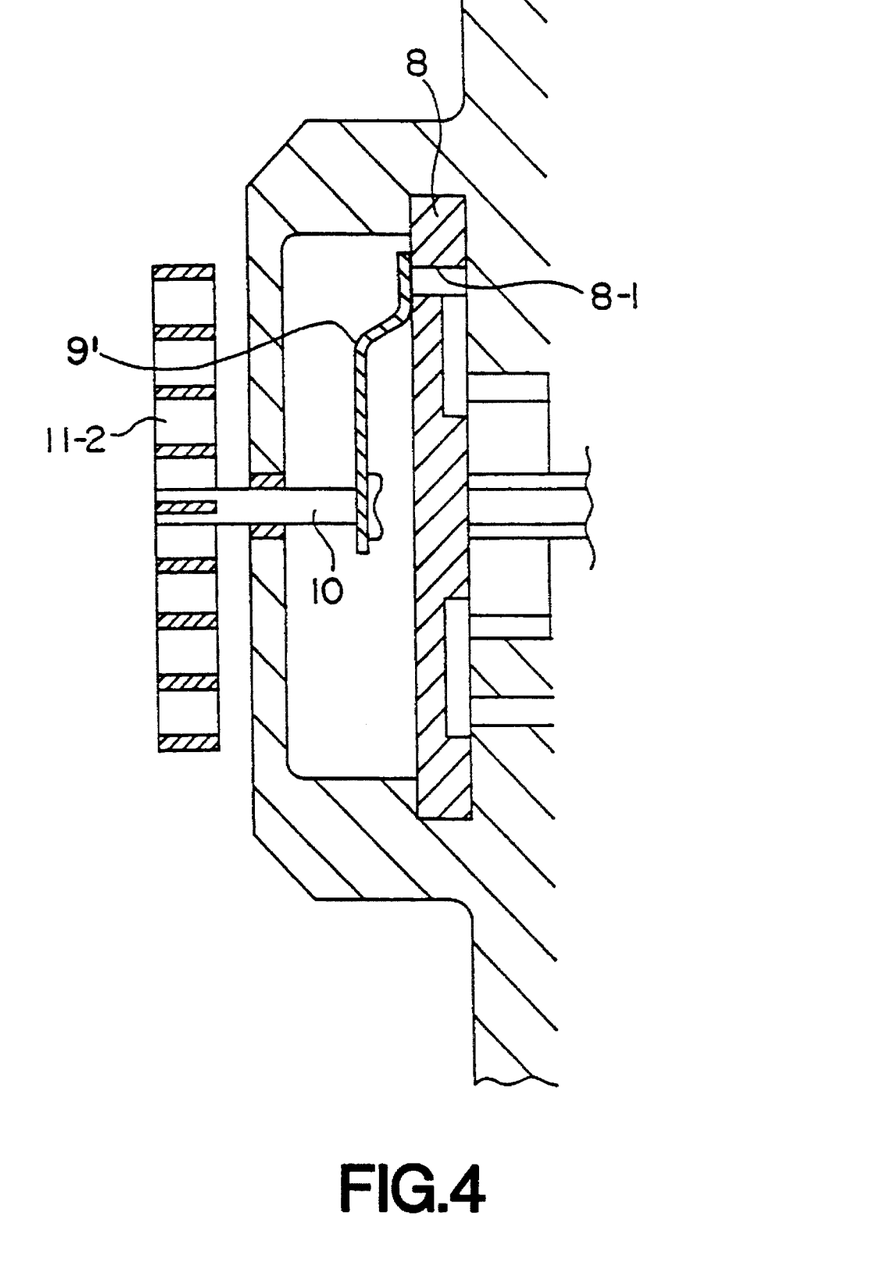
FIG. 4 is a vertically cross-sectional view of an important portion of an example of the temperature-sensitive type fluid clutch according to this invention using a spiral type bimetal as a temperature sensor.

Moreover when the temperature-sensitive spiral type bimetal is utilized, as seen in FIG. 4, a valve potion 9' is disposed at the inner end portion of the piston handle 10. The valve portion 9' is not secured to the partition plate 8, but is disposed in such a way that it can be rotatably in contact to the surface of the partition plate. Furthermore the spiral type bimetal 11-2 is provided at outer end portion of the valve actuator 10. With a similar way as the case when the aforementioned strip type bimetal 11 is employed, the valve portion 9' corresponds to the deformation that take place as a result of the temperature change of the spiral type bimetal to open or close the flow control hole 8-1 which is disposed at the partition plate 8. Namely, when the ambient temperature is high, the flow control hole 8-1 is opened by means of rotating the valve potion 9' through the valve actuator 10 and the oil inside the off basin chamber 6 is supplied to the torque transfer chamber through the pumping mechanism. On the other hand, when the ambient temperatures low, the valve portion 9' rotates in a reverse direction on the partition plate 8 through then valve actuator 10 and this will result in the closure of the flow control hole 8-1; hence the oil supply to the torque transfer chamber 5 will be stopped.

In the following, embodiments will be described referring to FIGS. 4 through 8. The same numbering is used if each component is identical to those in the foregoing embodiments.

Figures 5A, 5B:
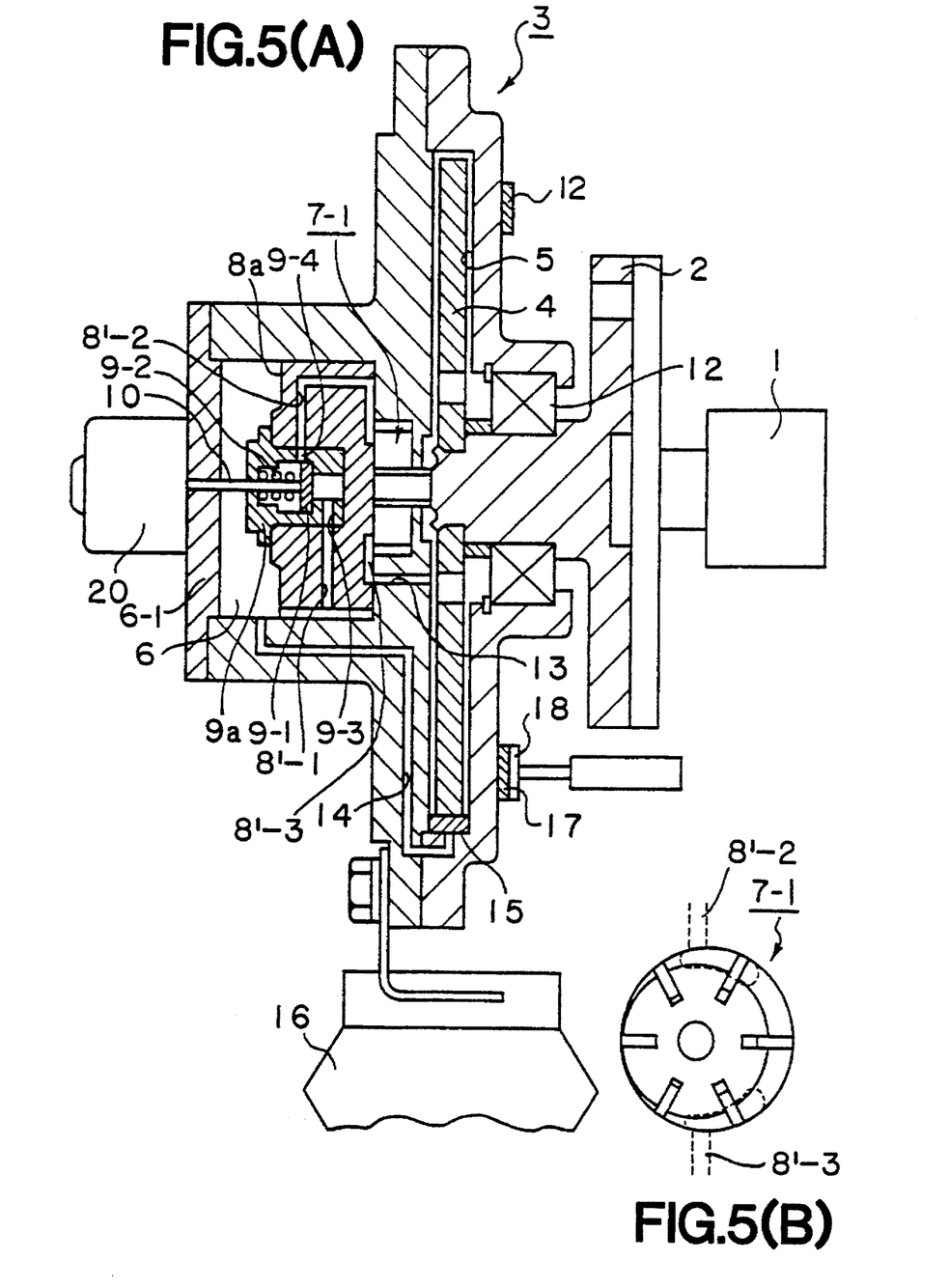
FIGS. 5(A) and 5(B) show an example of the fluid clutch according to the present invention, (A) is a vertically cross-sectional view showing the entire structure of the fluid clutch using a vane pump for a pumping mechanism and (B) is a generalized front view of the vane pump.

In the fluid clutch according to the embodiment, the switching valve block 8a instead of the partition plate 8 is installed inside the oil basin chamber 6. Moreover in the fluid clutch as seen in FIG. 5, the oil in the oil basin chamber 6 is sucked to the vane pumping mechanism 7-1 which is assembled between the case 3 and the switching valve 9a, an oil supply passage 8'-1, a switching valve 9a, a supply passage 8'-2. The off pressurized at the pumping mechanism 7-1 is furtherly fed to the torque transfer chamber 5 through the exhausting hole 13 which is disposed at the case 3. Furthermore, in the torque transfer chamber 5 and the oil bash chamber 6, a circulating passage is constructed with various means for purpose of oil supplying passage including the off supply passage 8'-1, 8'-2, the switching valve 9a, the vane pumping mechanism 7-1, the exhausting hole 13 and the exhaust passage 14.

Although the vane pump mechanism 7-1 has a similar structure as described for FIG. 1, the switching valve 9a is assembled in the block 8a which is provided inside the off basin chamber 6 being different from the valve portion 9 in the aforementioned embodiment. The valve portion 9-1 shields an inlet 9-3 and an outlet 94 of the valve in a normal operational (OFF) condition as seen in the figure, so that the oil is not going to be fed into the torque transfer chamber 5 by any means. Once the valve portion 9-1 operates (in other words, ON position) the inlet 9-3 and the outlet 94 am connected so that they act to suck the oil to the vane pumping mechanism 7-1 and the pressurized oil is fed to the torque transfer chamber 5 through the exhausting hole 13.

The aforementioned valve portion 9-1 is disposed at the distal end of the valve actuator 10 which projects from a solenoid type actuator 20 which is secured in its position on the outer surface of a housing 6-1 of the oil basin chamber 6. The flowing passage is switched by the solenoid type actuator 20.

The electric source to the solenoid type actuator 20 is supplied through a circuit through a slip ring 17 which is fixed on the outer surface of the case 3 on the driving shaft side and a brush 18 which is pushed to the slip ring 17 in a holder by a spring or the like. The brush 18 is electrically connected to a control unit (not shown) comprising of a microcomputer or the like. The control unit is basically constructed in such a way that a switching valve control command is fed to the solenoid type actuator 20 being based on the output signals from sensors that act to detect the water temperature of cooling water in the driving portion, reduction of the engine and the case, an opening angle of the throttle or the like.

In the aforementioned structure, a switching valve control command is fed from the control unit to activate the solenoid type actuator 20, so that the valve actuator 10 operates toward an opening direction to connect the inlet 9-3 and outlet 9-4 of the switch valve 9a. The oil in the oil basin chamber is furtherly sucked through the supply passage 8'-1, the switching valve 9a and the supply passage 8'-2 under the action of the vane pumping mechanism 7-1, is then pressurized by the pumping mechanism to be supplied to the oil basin chamber 5 through the exhausting hole 13. When the amount of oil which has been supplied to the torque transfer chamber 5 is increased, the torque transferring ratio by the oil inside the torque transfer chamber 5 is enhanced and the revolution of the case 3 is also increased and this will lead to the acceleration of the cooling fan 16.

On the other hand, if the electric source to the solenoid type actuator 20 is stopped, the piston handle 10 operates in the closing direction by the spring 9-2 to close the inlet 9-3 and outlet 9-4 of the switching valve 9a. Hence, the oil supply from the oil basin chamber 6 to the torque transfer chamber 5 will be consequently stopped, at the same time, the off in the torque transfer chamber 5 will be circulated back to the off basin chamber 6 through the exhausting passage 14 by the action of the dam 15 to reduce the torque transferring ratio and revolution of the case 3, so that cooling fan 16 will be in runt decelerated.

By the fluid clutch in which the trochoid pump is installed as seen in FIG. 5, the oil in the oil basin chamber 6 is sucked to a trochoid pump 7-2 which has been assembled in a position between the case 3 and the switching block 8a through the supply passage 8'-1, the switching valve 9a and the exhausting passage 8'-2 under the action of the trochoid pumping mechanism 7-2. The oil is furtherly pressurized by the aforementioned trochoid pump and is supplied to the torque transfer chamber 5 through the exhausting hole 13.

The trochoid pumping mechanism 7-2 is constructed in such a way that a rotor being disposed at the distal end of the rotating shaft 2 similarly to FIG. 2 is rotatably driven by the differences in the revolutions caused by the slip between case 3 and the driving disc 4 (rotating, shaft). The function of the fluid clutch having the trochoid pump therein is the same as that of the fluid clutch which has the vane pumping mechanism and been de,scribed before.

Figures 6A, 6B:
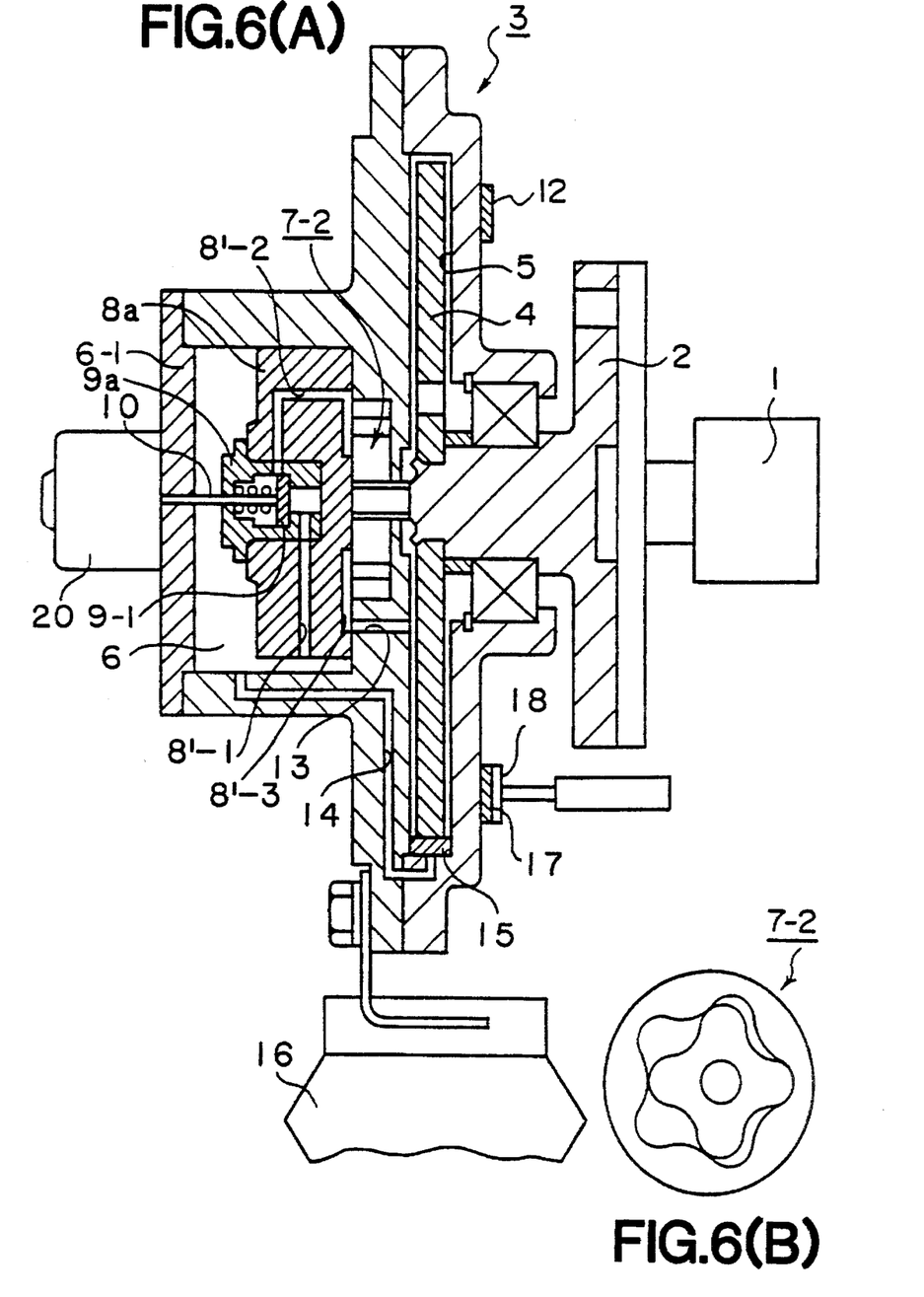
FIG. 6 is an example of the fluid clutch using a trochoid pump for a pumping mechanism according to the present invention, (A) is a vertically cross-sectional view showing an entire structure of the clutch, and (B) is a generalized front view of the trochoid pump.

By the fluid clutch in which a gear pump is disposed as seen in FIG. 6, the gear pumping mechanism 7-3 is assembled in location between the case 3 and the switching valve block The oil in the oil basin chamber 6 is sucked through the supply passage 8'-1, switching valve 9a and the exhausting passage 8'-2 under the action of the gear pumping mechanism 7-3. The oil pressurized by the gear pumping mechanism is then supplied from the exhausting hole 13 to the torque transfer chamber 5.

In contrast with an inside-contacting type gear pump, the trochoid pump mechanism has an outside-contacting type gear pump, so that the first gear is disposed to the routing shaft and the second gear is supported by the shaft. Hence the gear which is assembled at the distal end of the routing strait 2 is rotatably driven by the differences in the revolutions caused by the slip between the case 3 and the driving disc (muting shaft). The function of the fluid clutch in which the outside-contacting type gear pumping mechanism is disposed is the same as that of the fluid clutch which has the vane pumping mechanism therein.

Figures 7A, 7B:
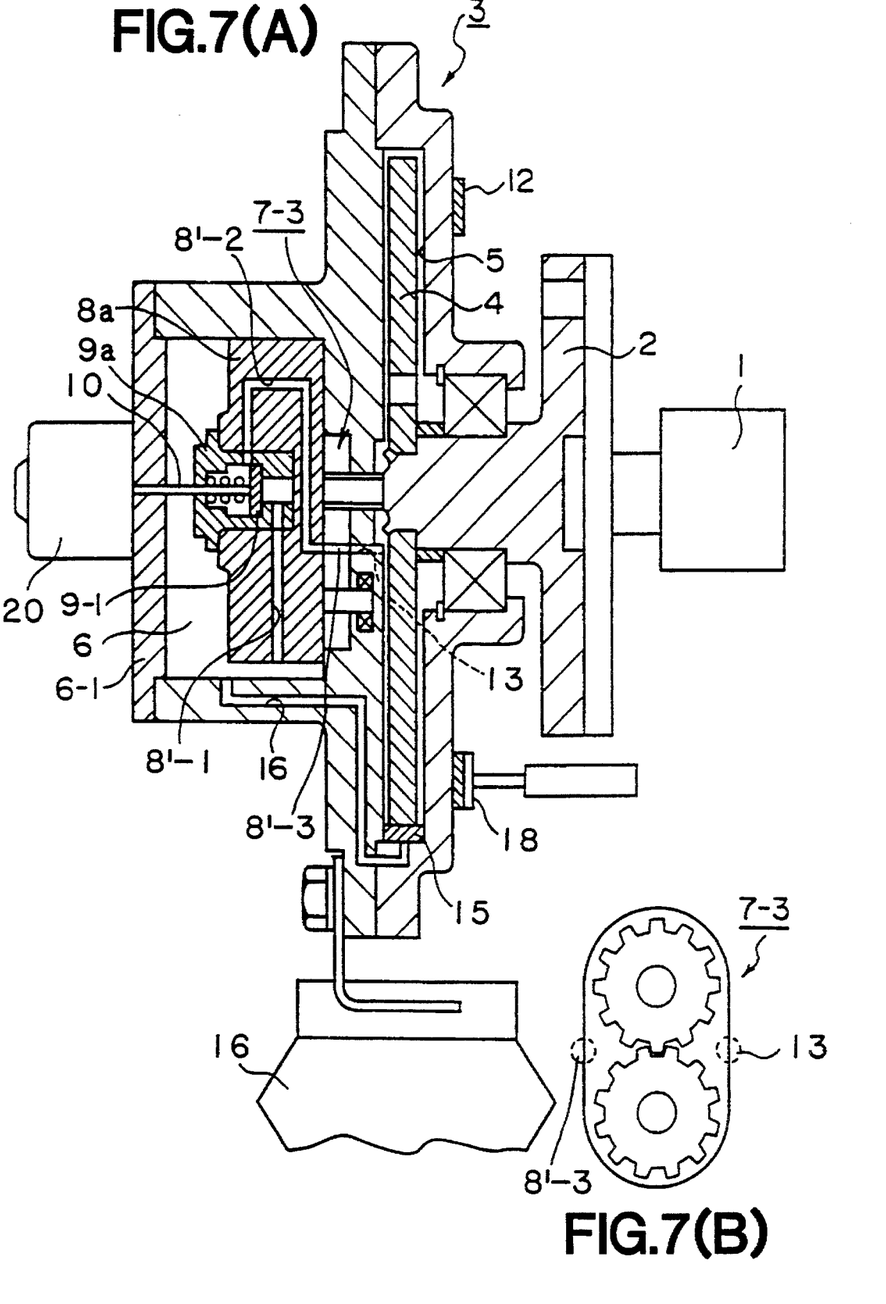
FIG. 7 is an example of the fluid clutch using a gear pump for a pumping mechanism according to the present invention, (A) is a vertically cross-sectional view showing an entire structure of the clutch, and (B) is a generalized front view of the gear pump.
Figure 8:
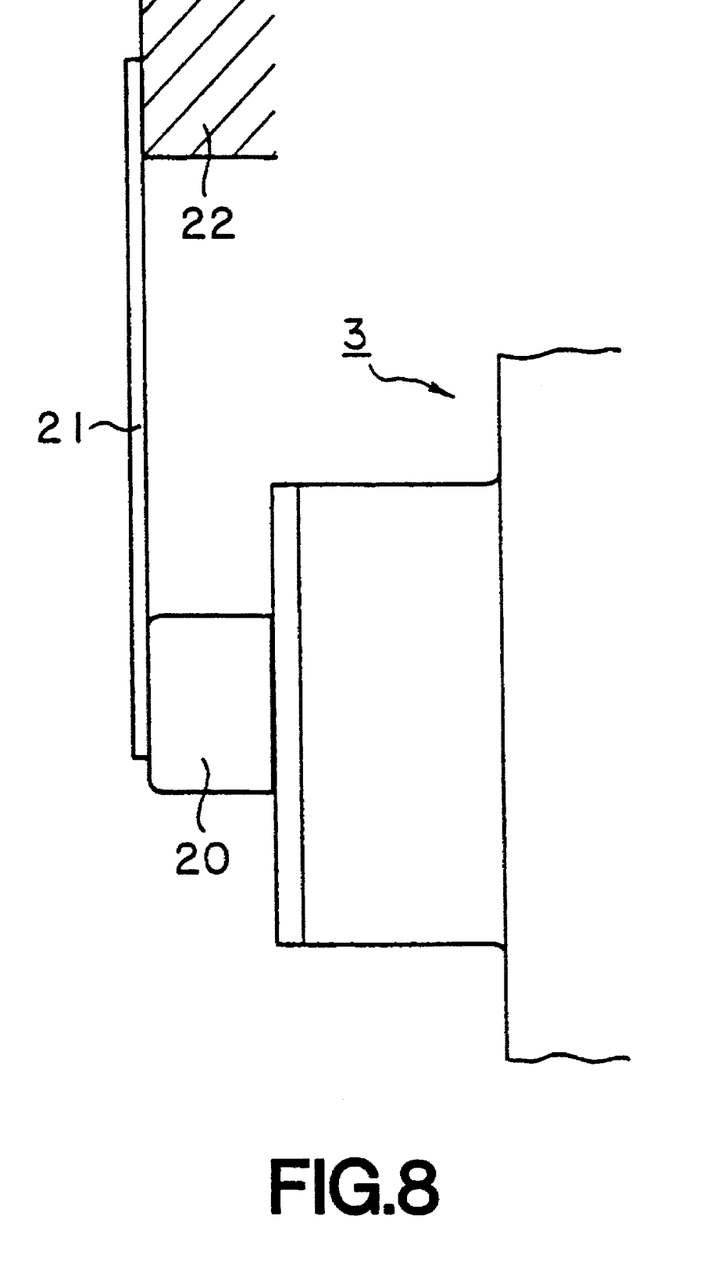
FIG. 8 shows a vertically cross-sectional view of an important portion of an example when the solenoid type actuator is disposed to a vehicle.

The solenoid type actuator 20 can be fixed to the case 3 in the form of one body as seen in FIG. 5 through 7, or it can be secured to the Vehicle body 22, an engine block, a radiator, a fan shroud, or the like through a stay 21 as seen in FIG. 8.

According to the aforementioned structure, when either the vane pumping mechanism, trochoid pumping mechanism, or me gear pumping mechanism is being employed as a pumping mechanism, the oil which is most suitably corresponding to the water temperature of the cooling water for the driving portion, revolution of the engine and the case or the opening angle of the throttle can be stored in the torque transfer chamber 5 for the aim of properly controlling the rotation of the cooling fan 16. At the same time, the oil can be smoothly and quickly supplied to the torque transfer chamber 5. Moreover, the circulating amount of the oil can be increased by increasing the supplying capacity for the oil, the remaining time of the oil between the torque transferring surfaces can be shortened; hence the undesired raise of the oil temperature can be avoided.

As for controlling parameters for the off amount to be supplied to the torque transfer chamber, there could be, beside the aforementioned water temperature of the cooling water for the driving portion, the revolution of the engine and revolution of the case, the wind amount during the operation, the ambient temperature, the air suction temperature, the vehicle speed, the opening angle of the throttle, the presence or absence of rapid acceleration, air pressure, the presence or absence of knocking, in addition to conditions of air conditioner, conditions of the exhaust air brake, or the like.

As described in the above, the fluid clutch, especially the temperature-sensitive type fluid clutch, according to the present invention, a pumping mechanism which can be driven by the differences in the revolution between the case and the driving disc (rotating shaft), and the forced circulation function to exhaust the oil from the torque transfer chamber quickly. Hence even if the excess amount of oil is present inside the torque transfer chamber, the "accompanying rotation" phenomenon that is more likely to take place at a re-starting or rapid accelerating the engine can be prevented. Moreover, the torque can be transferred at the best conditions from the driving disc to the case by means of valve including valve portion or open/close valve which is being operated in accordance to, for example, the ambient temperature. Consequently, the reduction of the noise level and enhancement of the fuel consumption efficiency can be achieved. The acceleration performance is also expected to be improved. Furthermore, since the oil is supplied by the internal pumping mechanism, the supply capacity is large. A large exhausting capacity can also be set by providing the dam corresponding to the enhanced supply capacity. Hence the circulating mount of the oil will be larger, so that the remaining time of the oil between the torque transferring faces can be shortened, having the advantages of that the temperature raise of the oil can be controlled, early deterioration of the oil or the shaft can be avoided, and the life of the system can be prolonged. Furthermore, since the pumping mechanism is disposed at the supplying side of the torque transfer chamber, load on the valve portion will be small and hence stable operation of the valve can be attained.

What is claimed is:

1. A fluid clutch comprising a rotatably driven shaft, a closed case rotatably disposed along a portion of said shaft and enclosing an end of said shaft, a torque transfer chamber and an oil basin chamber to store oil being defined inside the case, a driving disc rigidly mounted to the end of the shaft and being rotatably disposed inside the torque transfer chamber of the case, wherein the oil is supplied from the oil basin chamber to the torque transfer chamber to transfer a driving torque from said driving disc to the closed case, said fluid clutch being provided with an exhaust passage for delivering the oil from the torque transfer chamber to the oil basin chamber, a dam disposed on an inner face of the closed case and in proximity to the exhaust passage for urging oil from the torque transfer chamber into the exhaust passage and to the oil basin chamber, a pumping mechanism using differences in revolution between the case and the shaft being provided inside the case and between the oil basin chamber and the torque transfer chamber, an oil supplying passage extending from the oil basin chamber to an upstream side of the pumping mechanism, and a pump exhaust passage extending from a downstream side of the pumping mechanism to the torque transfer chamber to supply the oil inside the oil basin chamber to the torque transfer chamber by action of the pumping mechanism, a valve disposed in the oil basin chamber and upstream of the pumping mechanism to open or close said oil supplying passage, a valve actuator extending from said valve to a location external of said oil basin chamber, and a temperature sensor externally of said oil basin chamber and connected to said valve actuator for moving said valve in response to sensed changes of temperature and selectively opening or closing said oil supplying passage, .whereby said dam is disposed and dimensioned for rapidly circulating oil from said torque transfer chamber through said exhaust passage to said oil basin chamber, and whereby said pumping mechanism sucks oil from said oil basin chamber and urges the oil to said torque transfer chamber in accordance with differences in revolution between the case and the shaft and in accordance with the disposition of the valve relative to the oil supplying passage between the oil basin chamber and the pumping mechanism.

2. The fluid clutch cited in claim 1, wherein said closed case comprises a partition plate which divides the closed case into the oil basin chamber and the torque transfer chamber, said oil supplying passage extending through said partition plate.

3. The fluid clutch cited in claim 1, wherein said temperature-sensitive element comprises a bimetal which is in contact with said valve actuator.

4. The fluid clutch cited in claim 3, wherein a strip-type plate bimetal is employed for said temperature-sensitive element.

5. The fluid clutch cited in claim 1, wherein the oil supply passage is provided on a block disposed inside the oil basin chamber.

6. The fluid clutch cited in claim 5, wherein said valve is consisted of an open/close valve which is disposed in a midway position of the oil supply passage.

7. The fluid clutch cited in claim 1, wherein the valve actuator is a solenoid type actuator.

8. The fluid clutch cited in claim 7, wherein the solenoid type actuator is secured on the outer surface of the closed case and is constructed such that electrical power is supplied through a slip ring.

9. The fluid clutch cited in claim 7, wherein said solenoid actuator is secured to a vehicle body or an engine block.

10. The fluid clutch cited in claim 1 wherein said pumping mechanism is selected from the group consisting of a vane pump, a trochoid pump and a gear pump.

11. A fluid clutch comprising a rotatably driven shaft, a closed case rotatably disposed along a portion of said shaft and enclosing an end of said shaft, a torque transfer chamber and an oil basin chamber to store oil being defined inside the case, a driving disc rigidly mounted to the end of the shaft and being rotatably disposed inside the torque transfer chamber of the case, wherein the oil is supplied from the oil basin chamber to the torque transfer chamber to transfer a driving torque from said driving disc to the closed case, said fluid clutch having an exhausting passage extending from the torque transfer chamber to the oil basin chamber, a dam mechanism disposed on an inner side of the closed case in proximity to the exhausting passage for urging oil from the torque transfer chamber to the oil basin chamber, a pumping mechanism utilizing differences in revolution between the case and the shaft being provided inside the case and between the oil basin chamber and the torque transfer chamber, an oil supplying passage extending from the oil basin chamber to an upstream side of the pumping mechanism and a pump exhaust passage extending from a downstream side of the pumping mechanism to the torque transfer chamber to supply the oil inside the oil basin chamber to the torque transfer chamber under action of the pumping mechanism, a partition plate having an oil flow control hole communicating with the oil supplying passage, a plate-shaped valve being disposed inside the oil basin chamber for selectively opening and closing the oil flow control hole, a temperature-sensitive element comprising a bimetal being provided on an outer surface of the oil basin chamber of said closed case, and a valve actuator which passes through the closed case and in contact to the plate-shaped valve, so that the flow control hole can be opened or closed by the plate-shaped valve in accordance with a curved deformation of the temperature-sensitive element that occurs due to temperature changes, whereby said pumping mechanism sucks oil from said oil basin chamber and urges the oil to said torque transfer chamber.

12. The fluid clutch cited in claim 11, wherein said pumping mechanism is selected from the group consisting of a vane pump, a trochoid pump and a gear pump.

13. The fluid clutch cited in claim 11, wherein the bimetal is selected from the group consisting of a strip-shaped plate bimetal and a spiral-shaped plate bimetal is used as said temperature-sensitive element.

14. A fluid clutch comprising a rotatably driven shaft, a closed case rotatably disposed along a portion of said shaft and enclosing an end of said shaft, a torque transfer chamber and an oil basin chamber to store oil being defined inside the case, a driving disc rigidly mounted to the end of the shaft and being rotatably disposed inside the torque transfer chamber of the case, wherein the oil is supplied from the oil basin chamber to the torque transfer chamber to transfer a driving torque from said driving disc to the closed case, said fluid clutch comprising an exhaust passage extending from the torque transfer chamber to the oil basin chamber, a dam mechanism being disposed on an inner side of the closed case and in proximity to the exhausting passage for urging oil from the torque transfer chamber into the exhaust passage and to the oil basin chamber, a pumping mechanism utilizing differences in revolution between the case and the rotating shaft being provided inside the case and between the oil basin chamber and the torque transfer chamber, a block disposed inside the oil basin chamber and having an oil supply passage extending to an upstream side of the pumping mechanism, and a pump exhaust passage extending from a downstream side of the pumping mechanism to the torque transfer chamber to supply the oil in the oil basin chamber to the torque transfer chamber by said pumping mechanism, a switching valve in the oil basin chamber and communicating with the oil supply passage, and a solenoid-type actuator being disposed on an outer side of the oil basin chamber of the closed case and having a portion extending into the oil basin chamber and communicating with the switching valve so that said switching valve can be operated in accordance with signals of said solenoid-type actuator.

15. The fluid clutch cited in claim 14, wherein said pumping mechanism is selected from the group consisting of a vane pump, a trochoid pump an a gear pump.

16. The fluid clutch cited in claim 14, wherein said solenoid type actuator is secured to the outer side of the closed case and is constructed such that electric power is supplied through a slip ring.

17. The fluid clutch cited in claim 14, wherein said solenoid type actuator is secured to a location on a vehicle spaced from said casing.

* * * * *